United States Patent
Warner

[11] Patent Number: 6,148,910
[45] Date of Patent: Nov. 21, 2000

[54] BATTERY HEATING SYSTEM

[75] Inventor: Joseph G. Warner, Sterling Heights, Mich.

[73] Assignee: The United States of America as represented by the Secretary of the Army, Washington, D.C.

[21] Appl. No.: 09/301,367

[22] Filed: Apr. 20, 1999

[51] Int. Cl.[7] .......................... H01M 2/00; H01M 10/50; B60H 1/00
[52] U.S. Cl. .................. 165/297; 165/41; 237/2 A; 237/12.3 B; 237/12.3 R; 237/12.3 A; 429/120; 429/62; 429/163
[58] Field of Search .................. 237/12.3 A, 12.3 R, 237/12.3 B, 2 A; 165/41, 297; 429/38, 39, 120, 62, 163

[56] References Cited

U.S. PATENT DOCUMENTS

| | | | |
|---|---|---|---|
| 2,410,952 | 11/1946 | Lighton | 429/120 |
| 2,761,006 | 8/1956 | Kramer | 429/120 |
| 3,110,633 | 11/1963 | Bachmann | 429/120 |
| 3,837,918 | 9/1974 | Nakabayashi | 429/120 |
| 4,054,730 | 10/1977 | Crifasi | 429/120 |
| 4,255,502 | 3/1981 | Taylor, III | 429/120 |
| 4,830,937 | 5/1989 | Clerici | 429/120 |
| 4,840,855 | 6/1989 | Foti et al. | 429/120 |
| 5,278,002 | 1/1994 | Hiers | 429/120 |
| 5,449,571 | 9/1995 | Longardner et al. | 429/120 |
| 5,549,153 | 8/1996 | Baruschke et al. | 237/12.3 B |
| 5,678,760 | 10/1997 | Muso et al. | 237/2 A |
| 5,681,668 | 10/1997 | Reed et al. | 429/120 |

FOREIGN PATENT DOCUMENTS 12152 of 1900 United Kingdom .................. 429/120

*Primary Examiner*—John K. Ford
*Attorney, Agent, or Firm*—Peter A. Taucher; David L. Kuhn

[57] ABSTRACT

A system provides a controlled supply of heat from an automotive engine to battery on board the vehicle. The system has a fluid circuit, a portion of which passes through an insulated box containing the battery and thereby heats the battery. Another portion of the fluid circuit bypasses the box. The fluid circuit has one or more valves for selectively interrupting flow of heated fluid to the box, the valves operating in response to driver input or signals sent by a temperature sensor in the box. The box itself is comprised of rigid side walls of insulative material, a floor of the same material and a lid that closely fits to the side walls in only one orientation relative to the box. On the box's inner peripheral surface is a heat reflective layer to which is mounted the battery heating coil of the fluid circuit. A low heat conductive spacer borders air gaps between the battery and the heating coil.

9 Claims, 3 Drawing Sheets

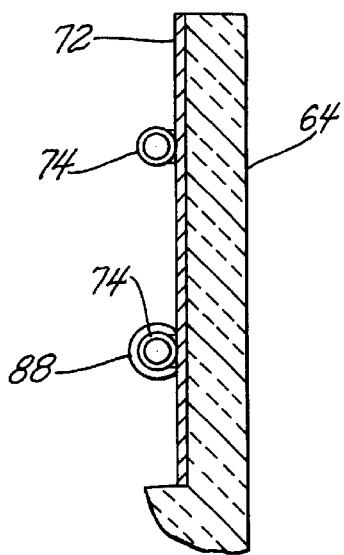
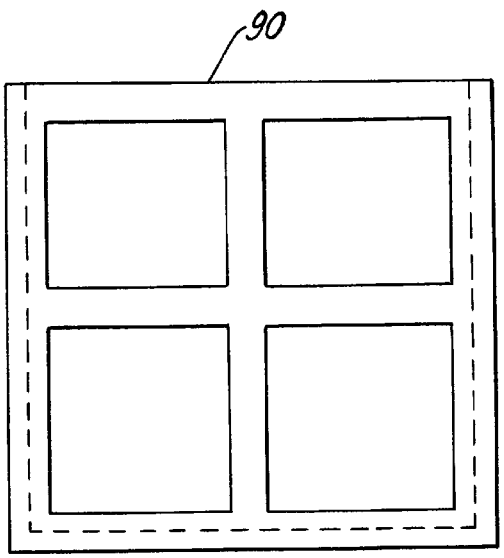
Fig. 5
Fig. 6
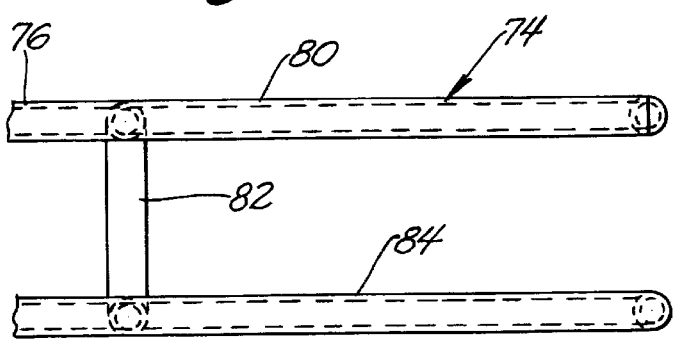
Fig. 7
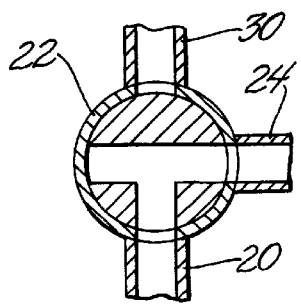 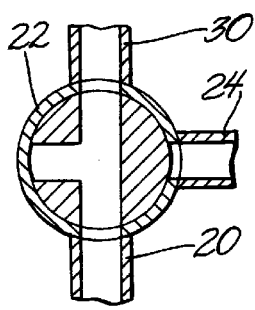 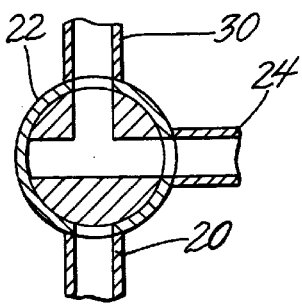
Fig. 8   Fig. 9   Fig. 10

BATTERY HEATING SYSTEM

GOVERNMENT USE

The invention described here may be made, used and licensed by the or for the U.S. Government for governmental purposes without paying me any royalty.

BACKGROUND

One of the traditional requirements for a military vehicle is the ability to operate under extreme climate conditions that normal vehicle can not tolerate. Military vehicles must often operate under arctic conditions, when, among other things, vehicle batteries have shortened life spans. A particular problem involves the relatively common occurrence wherein a vehicle sits overnight in frigid conditions for 8 to 12 hours after a day of operation. After the 8 to 12 hour period, extra battery power is needed to start the vehicle, yet the battery will have been at a temperature of 30° F. or more below zero for at least several hours. The batteries tend to die or have insufficient power under these conditions. My invention addresses this problem by heating the battery during vehicle operation and keeping the battery warm during overnight vehicle down times or other down times. Consequently, restarting the vehicle is easier and the chance of damaging the battery is reduced.

SUMMARY

My invention is a system that can be retrofit into existing military vehicles. The system provides a controlled supply of heat from an automotive engine to battery on board the vehicle. The system has a fluid circuit, which uses either coolant from the engine's water jacket or exhaust gas from the engine's exhaust manifold. A portion of the fluid passes through an insulated box containing the battery and another portion of the fluid circuit bypasses the box. The fluid circuit has one or more valves for selectively diverting flow of heated fluid to the box, the valves operating in response to driver input signals or signals from a temperature sensor in the box. The box has rigid side walls of insulative material, a floor of the same material and a lid that closely fits on the box in only one orientation. The inner peripheral surface of the box has a heat reflective layer to which is mounted the battery heating coil of the fluid circuit. A thermally nonconductive spacer creates air gaps between the battery and the heating coil.

BRIEF DESCRIPTION OF THE DRAWINGS

FIG. 5 is a sectioned detail view showing a side wall, a metal heat reflecting layer on the side wall and the heating coils attached to the metal layer.

FIG. 6 is a side elevational view of the spacer alone.

FIG. 7 is a side elevational view of the heating coil alone.

FIG. 8 shows a three-way valve used in the first embodiment of my system, the valve being in a normal mode.

FIG. 9 shows the three-way valve in a bypass mode and

FIG. 10 shows the three-way valve in a completely closed mode.

DETAILED DESCRIPTION

Figure 1:
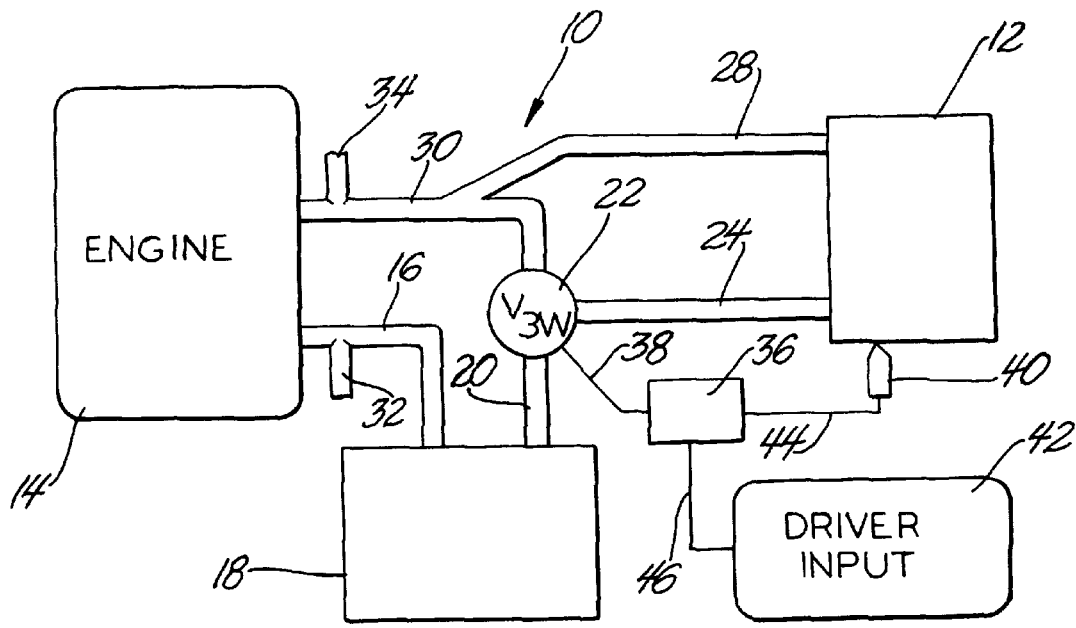
FIG. 1 is a semi-schematic depiction of a first, hydraulic embodiment of my system.
Figure 3:
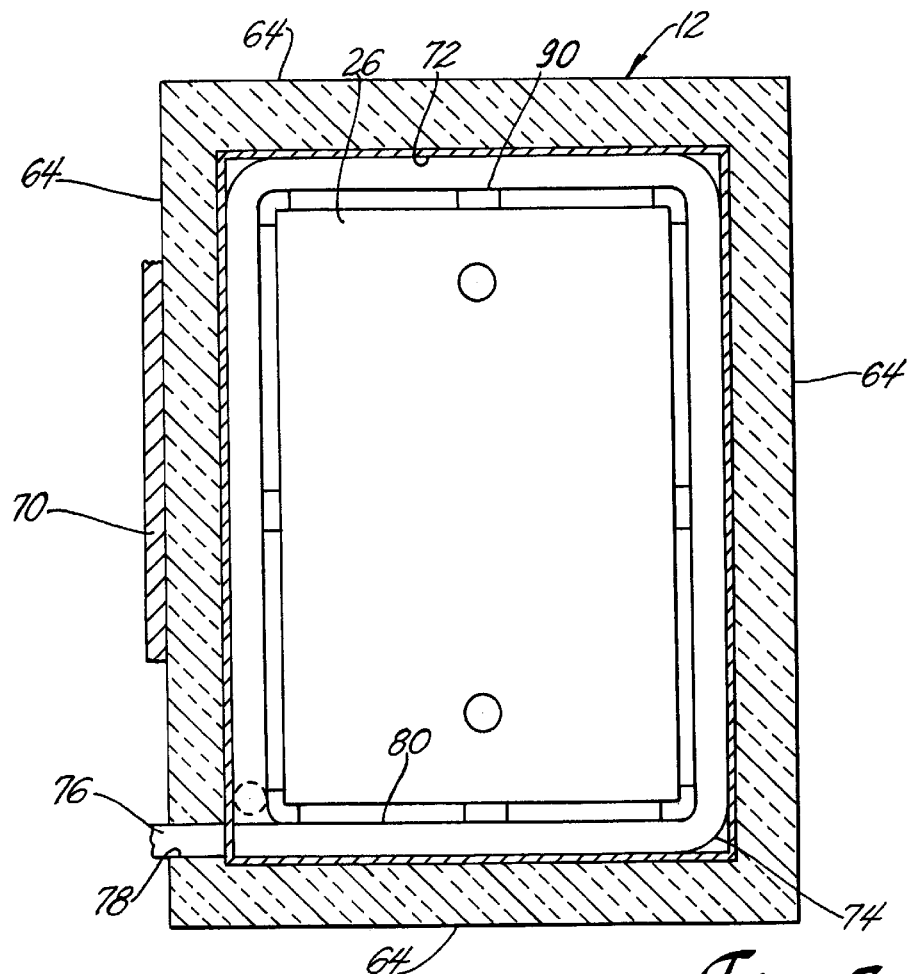
FIG. 3 is a partly sectioned plan view of an insulated box with a battery, spacer and heating coils therein.

FIG. 1 shows a first system 10 containing a fluid circuit for the controlled heating of a vehicle battery wherein the battery is located in an insulated box 12. The heat source is a water-cooled vehicle engine 14 having an exit coolant line 16 leading from the engine's water jacket (not shown) to a passenger compartment heating mechanism 18. Coolant from mechanism 18 flows to a three-way valve 22, which has a normal mode wherein the coolant is routed through conduit 24 to battery box 12, where the coolant circulates and imparts heat to a battery 26 (FIG. 3). Coolant then exits the battery box through conduit 28, which feeds into conduit 30 leading back to engine 14. Valve 22 has a bypass mode wherein coolant flows directly from conduit 20 to conduit 30, so that battery box 12 receives no flow. Valve 22 has a closed mode in which it blocks coolant flow from line 20, so that all coolant flows from engine 14 directly to the radiator (not shown) through line 32 and then returns to the engine through line 34. The normal, bypass and closed modes of valve 22 are illustrated in FIGS. 8, 9 and 10.

Valve 22 is controlled by a logic circuit 36, which can be incorporated into a semiconductor chip or be part of an on-board programmed computer. Logic circuit 36 sends control signals to valve 22 through line 38, the control signals being responsive to input signals or commands over lines 46 and 44 from a driver input mechanism 42 and a temperature sensor 40 in box 12. Driver input mechanism 42 will send commands to turn heat to mechanism 18 on or off, this typically being done in conjunction with a known vehicle climate control mechanism which automatically maintains passenger compartment temperature at a level selected by the vehicle driver. It is contemplated that the driver input will include commands to open or close flow of coolant to battery box 12. Sensor 40 will also send control signals over line 44 to logic circuit 36. Sensor 40 will send an "open" signal to circuit 36 when the temperature in box 12 falls below a selected minimum of, say, 50° F. If the temperature in box 12 exceeds a predetermined maximum of, say 90° F., then sensor 40 will send a "close" signal to circuit 36.

If driver input 42 includes a command to send heat to mechanism 18 and if sensor 40 sends an "open" signal to circuit 36, then circuit 36 will send a "normal" signal to valve 22, whereupon valve 22 assumes its normal configuration illustrated in FIG. 8, wherein coolant flows to both mechanism 18 and box 12. If the driver input includes a command to send heat to mechanism 18 and sensor 40 sends a "close" signal, then circuit 36 sends a "bypass" signal to valve 22, which then assumes its bypass configuration shown in FIG. 9. If the driver input includes a command to stop the heat to mechanism 18 while sensor 40 sends a "close" signal to circuit 36, then circuit 36 sends a "closed" signal to valve 22, which then assumes its closed configuration illustrated in FIG. 10. Likewise, if the driver input includes a command to cease heat to mechanism 18 and a command to cease heat to box 12, then circuit 36 sends a "closed" signal to valve 22.

Figure 2:
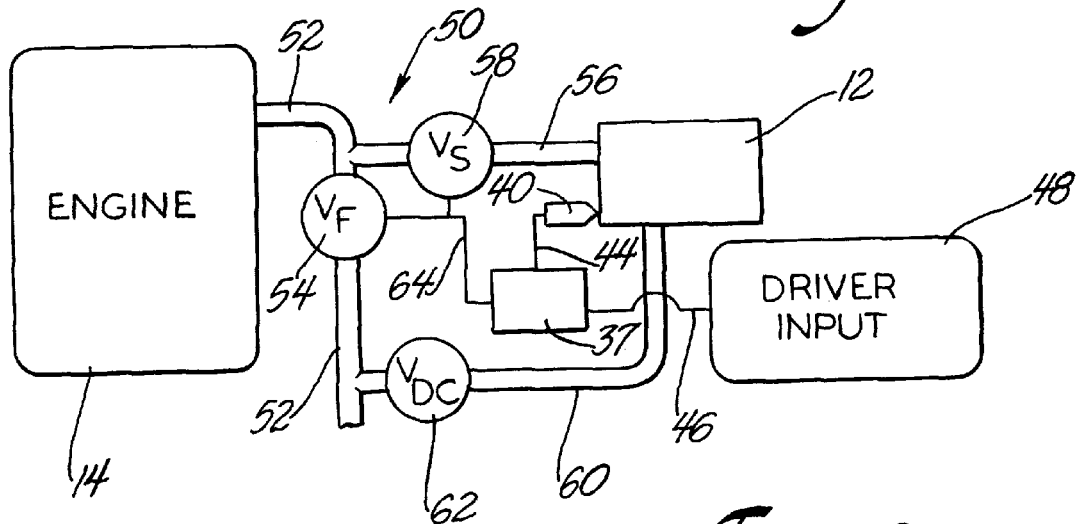
FIG. 2 is a semi-schematic depiction of a second, pneumatic embodiment of my system.

FIG. 2 shows another embodiment of my system 50 for the controlled heating of a vehicle battery wherein the heat source is exhaust from a vehicle engine 14. Battery box 12, engine 14, sensor 40, line 44 and line 46 in FIG. 2 are the same structurally and functionally as the like numbered elements in FIG. 1. An exhaust pipe 52 carries exhaust gas from engine 14 and has a flapper valve 54 incorporated therein for controlled restriction of gas flow from engine 14. Upstream of valve 54 is a connection where box supply pipe 56 tees from pipe 52 and carries heated exhaust gas to box 12. Incorporated in pipe 56 is a shut-off valve 58 that can be closed when box 12 does not need heat. A return pipe 60 receives exhaust gas that has circulated though box 12 and carries the gas back to pipe 52 at a location downstream of valve 54. An optional check or directional control valve 62 may be incorporated in line 60 to prevent exhaust gas in pipe 52 from entering pipe 60.

System 50 is always in one of two conditions, one where exhaust gas flows into box 12 to heat battery 26 and a second condition where exhaust gas is directed straight through pipe 52 so as to completely bypass box 12. During the first condition, valve 54 restricts flow through pipe 52 and valve 58 opens, so that exhaust gas from engine 12 is directed through pipe 56 to box 12. During the second condition, valve 54 is fully open and valve 58 is closed. Valves 54 and 58 are controlled by logic circuit 37, which sends out control signals over line 64. Logic circuit 37 receives input signals on lines 44 and 46 from temperature sensor 40 and driver input mechanism 48. Sensor 40 sends out a "high" signal to logic circuit 37 when the temperature in box 12 exceeds a selected maximum and sends out a "low" signal to logic circuit 37 when the temperature in box 12 falls below a selected minimum. Normally circuit 37 sends out a first control signal to cause valve 54 to restrict flow and cause valve 56 to be open when sensor 40 sends a "low" signal. If sensor 40 sends out a "high" signal to circuit 36, then circuit 37 will cause valve 54 to be in a nonrestrictive mode and will cause valve 56 to close. Circuit 37 will do the same whenever it receives an overriding, "manual close," signal from driver input mechanism 48, which may simply be a manual override switch operable by the vehicle driver.

FIG. 3 shows a plan, partly sectioned view of battery box 12 and related structure, wherein side walls 64 are of any suitable insulative material and form an enclosure about battery 26. As seen in conjunction with FIG. 4, side walls 64 cooperate with a base panel or floor 66 and lid 68 to completely encapsulate the battery. The side walls, floor and lid can be rigid so as to form a protective housing for elements inside box 12, or the box 12 may have a relatively tough exterior layer or skin 70 to protect the insulative material and the elements inside. On the inner peripheral surface of side walls 64 is a thin metal layer 72 whose inner, exposed surface is shiny so as to have a heat reflecting quality.

Figure 4:
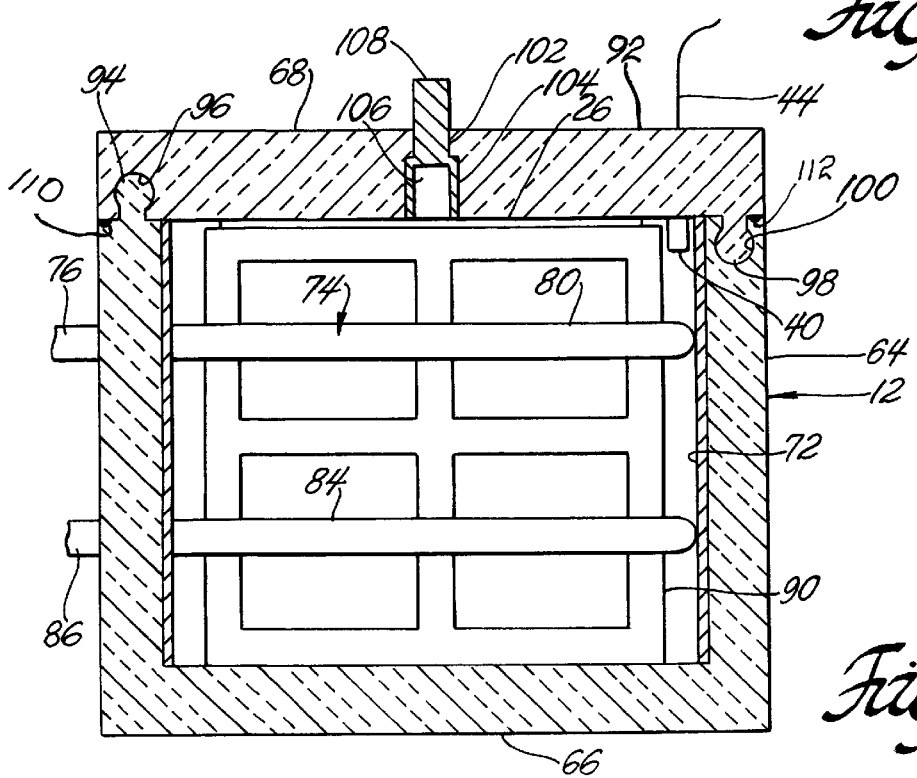
FIG. 4 is a partly sectioned side elevational view of an insulated box with a battery, spacer and heating coils therein.

As seen in FIGS. 3, 4 and 7, there is affixed to layer 72 a heat transfer coil 74 having an entry end 76 extending through aperture 78 of box 12. The entry end connects with upper coil portion 80 that conducts heated fluid counter-clockwise around battery 26 in FIG. 3 and terminates at a junction with a connector coil segment 82. Segment 82 connects with a lower coil segment 84 that conducts heated fluid clockwise around battery 26 to the coil's exit end 86 that extend through a side wall of box 12. It may be preferred that coil 74 be connected directly to layer 72 so that layer 72 will act as a large radiator fin for coil 74, and it may be preferred that coil 74 has a plethora of disk-like heat radiation fins 88 as shown in FIG. 5. Coil 74 is spaced from battery 26 by a cage-like separator 90, which is preferably a poor conductor of heat. Spacer 90 need not contact coil 74 and can be of a rigid mesh construction that holds battery 26 away from the coil. The spacer can be of any suitable structure that prevents heat transfer directly from the coils to the battery but allows air heated by the coils to contact the battery.

As seen in FIG. 4, box 12 is provided with a cover panel or lid 92 of the same general insulative construction as side walls 64. Lid 92 can be fastened to box 12 by clips or other conventional means or can have a snap fit as seen in FIG. 4. There, a head 94 on side wall 64 fits into a socket 96 in lid 92 while another head 98 on lid 92 fits into a complementary socket 100 in another side wall 64. Heads 94 and 98 and the corresponding sockets make it possible to fit lid 92 onto box 12 only one way, so that the lid's battery receptacles are always mated with the correct battery terminal. A typical receptacle 102 has a female end 104 fitting closely over battery terminal 106 as shown in FIG. 4. The protruding male end 108 of the receptacle preferably has the same shape as the terminal fitting in the receptacle's female end so that the same battery cable terminus (not shown) will fit onto either terminal 106 or receptacle 102. Temperature sensor 40 is shown mounted on the underside of lid 92 but can be otherwise suitably mounted inside box 12. Preferably, lid 92 has peripheral seals 110 and 112. It may also be preferable to provide an air gap between the top of battery 26 and the underside of lid 92.

I wish it to be understood that I do not desire to be limited to the exact details of construction or method shown herein since obvious modifications will occur to those skilled in the relevant arts without departing from the spirit and scope of the following claims.

What is claimed is:

1. A system for providing a controlled supply of heat from an engine to a battery, comprising:
   a fluid circuit;
   an insulated box containing the battery;
   means in the fluid circuit for supplying heated fluid from the engine to the battery;
   means in the fluid circuit connected to the supplying means for circulating the heated fluid through the box;
   means in the fluid circuit for transporting circulated fluid from the box;
   means in the fluid circuit for selectively interrupting flow of heated fluid from the supplying means to the box;
   wherein the insulated box comprises:
      side panels of insulative material;
      a base panel connected to the side walls;
      a cover panel removably attached to the side walls;
      a heat reflective layer in the box disposed so that the circulating means is between the reflective layer and the battery; and
      means in the box for spacing the circulating means from the battery.

2. The system of claim 1 further comprising:
   a receptacle in the cover panel;
   a female end of the receptacle fitting closely over a terminal of the battery; and
   a male end of the receptacle protruding from the cover panel, the male end having a shape similar to the terminal.

3. The system of claim 1 wherein the spacing means is a rigid structure of low heat conductivity holding the battery in a fixed position within the box, the spacing means bordering air-filled gaps between the battery and the circulating means.

4. A system for providing a controlled supply of heat from an engine to a battery in a vehicle having a passenger compartment and a heating mechanism for warming the passenger compartment, the system comprising:
   a hydraulic circuit;
   a first conduit of the hydraulic circuit receiving heated liquid from a water jacket of the engine and carrying the heated liquid to the heating mechanism;

a second conduit of the hydraulic circuit receiving the liquid from the heating mechanism and carrying the liquid back to the water jacket;

an insulated box containing the battery;

a heating coil of the hydraulic circuit within the insulated box, the heating coil having an entry end and an exit end;

a third conduit of the hydraulic circuit connected between the second conduit and the entry end of the heating coil;

a fourth conduit of the hydraulic circuit connected between the second conduit and the exit end of the heating coil;

means in the hydraulic circuit for selectively interrupting the flow of liquid through the heating mechanism and the heating coil;

wherein the insulated box comprises:
   side panels of insulative material;
   a base panel connected to the side walls;
   a cover panel removably attached to the side walls;
   a heat reflective layer in the box disposed so that the heating coil is between the reflective layer and the battery;
   means in the box for spacing the heating coil from the battery.

5. The system of claim 4 further comprising means for controlling the interrupting means, the controlling means having a sensor detecting temperature inside the box, a driver input mechanism, and a logic circuit sending control signals to the interrupting means in response to input signals from the sensor and the driver input mechanism.

6. The system of claim 4 wherein the interrupting means is a three-way valve disposed in the second conduit and connected to the third conduit.

7. A system for providing a controlled supply of heat from an engine to a battery, comprising:
   a pneumatic circuit including an exhaust pipe carrying exhaust gas from the engine;

an insulated box containing the battery;

means for supplying at least some of the exhaust gas from the exhaust pipe to the battery;

means connected to the supplying means for circulating the gas through the box;

means for transporting circulated gas from the box;

means in the pneumatic circuit for selectively interrupting flow of gas to the box, the interrupting means including a restriction valve in the exhaust pipe;

wherein the insulated box comprises:
      side panels of insulative material;
      a base panel connected to the side walls;
      a cover panel removably attached to the side walls;
      a heat reflective layer in the box disposed so that the circulating means is between the reflective layer and the battery; and
      means in the box for spacing the circulating means from the battery.

8. The system of claim 7 further comprising:

means for sensing temperature in the box; and means for controlling the interrupting means in response to signals from the sensing means.

9. The system of claim 7 further including means for controlling the interrupting means, the controlling means comprising:

means for sensing temperature in the box;

a driver input mechanism;

a logic circuit communicated with the sensing means and the driver input mechanism and also communicated with the interrupting means, the logic circuit sending control signals to the interrupting means in response to input signals from the sensing means and the driver input mechanism.

* * * * *